May 27, 1924.

J. F. H. FECHTENBURG ET AL 1,495,783

TALKING MACHINE

Filed Jan. 23, 1922     5 Sheets-Sheet 1

Inventors.—
Jörgen F. H. Fechtenburg,
Gunnar P. Persson,
William T. Oberhuber.
by their Attorneys.—
Howson & Howson

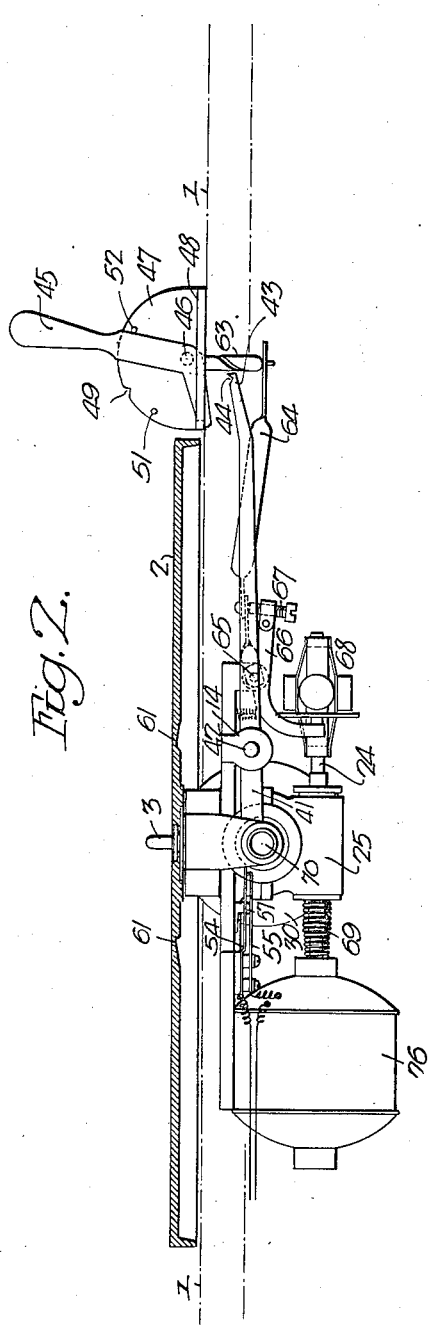
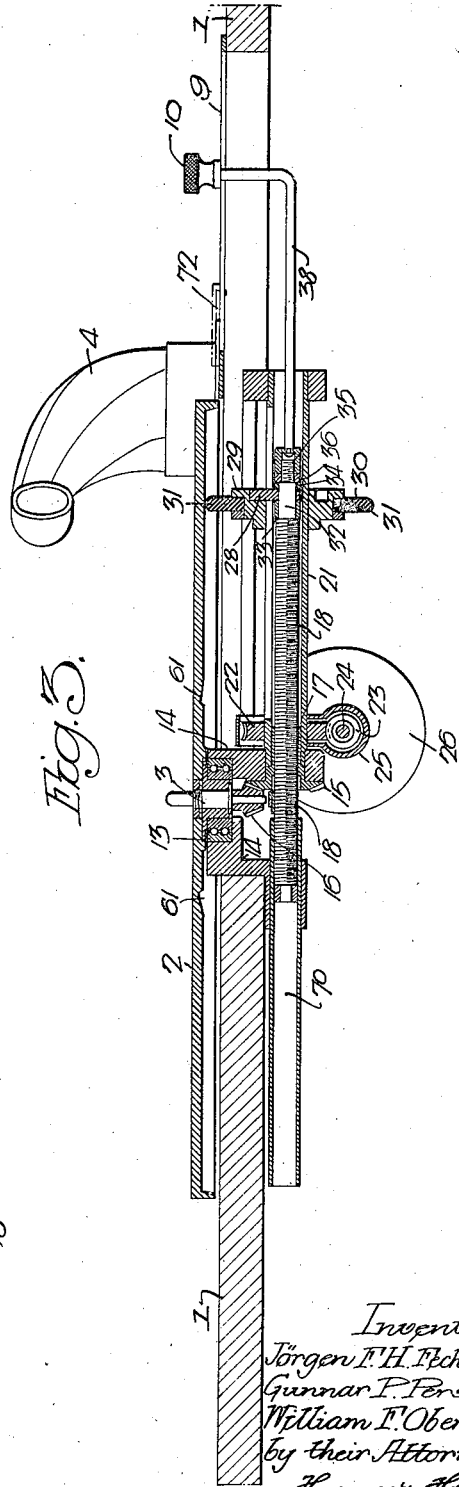

May 27, 1924.
J. F. H. FECHTENBURG ET AL
1,495,783
TALKING MACHINE
Filed Jan. 23, 1922
5 Sheets-Sheet 3
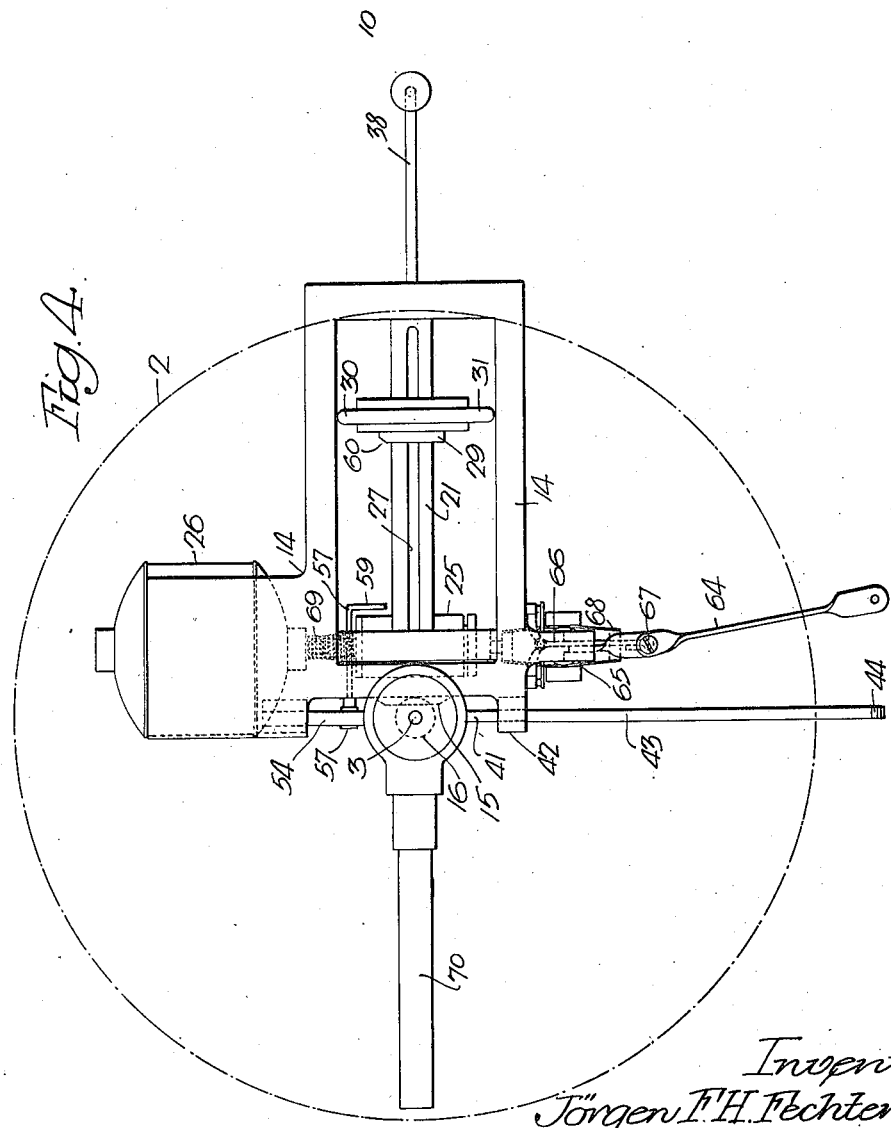

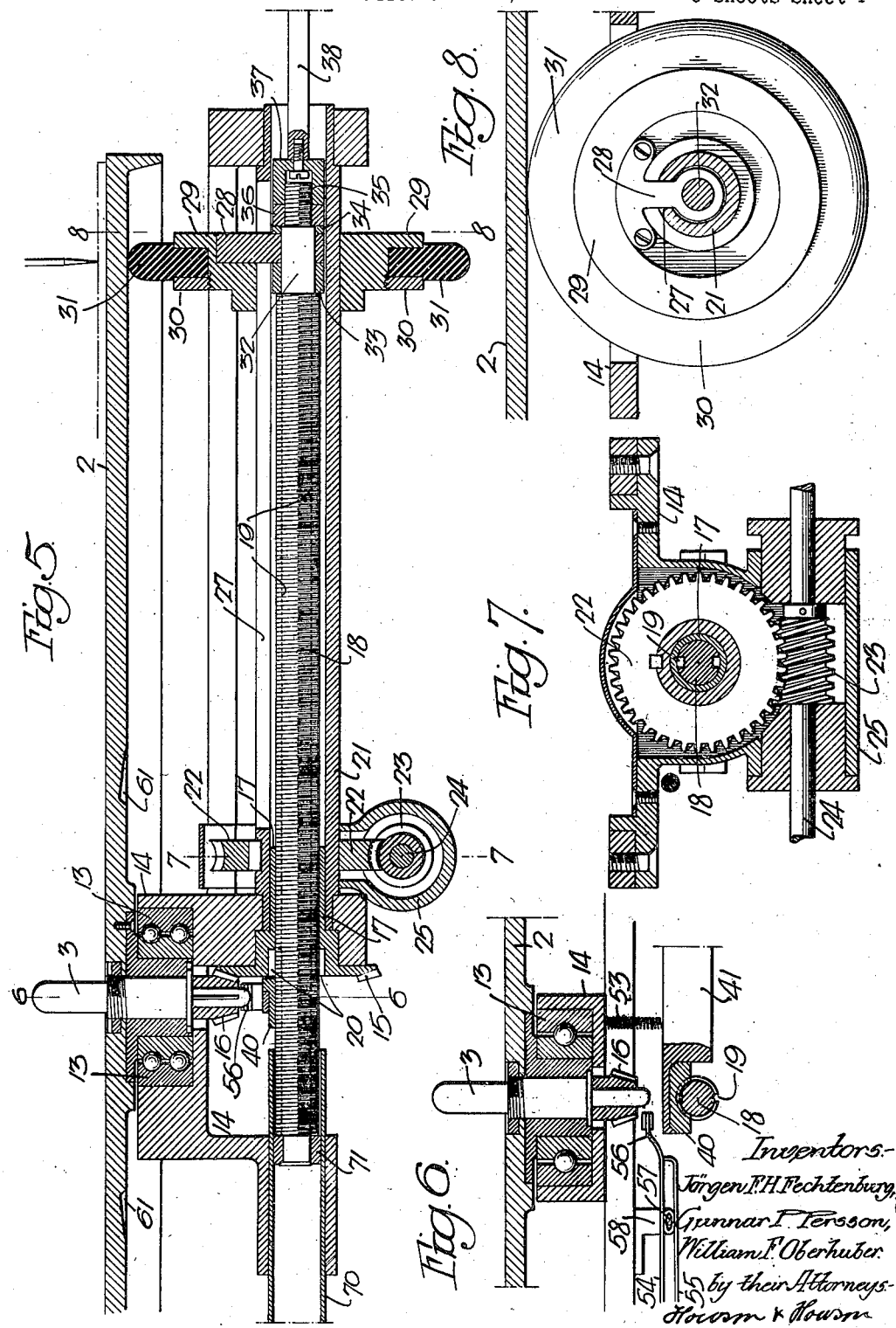

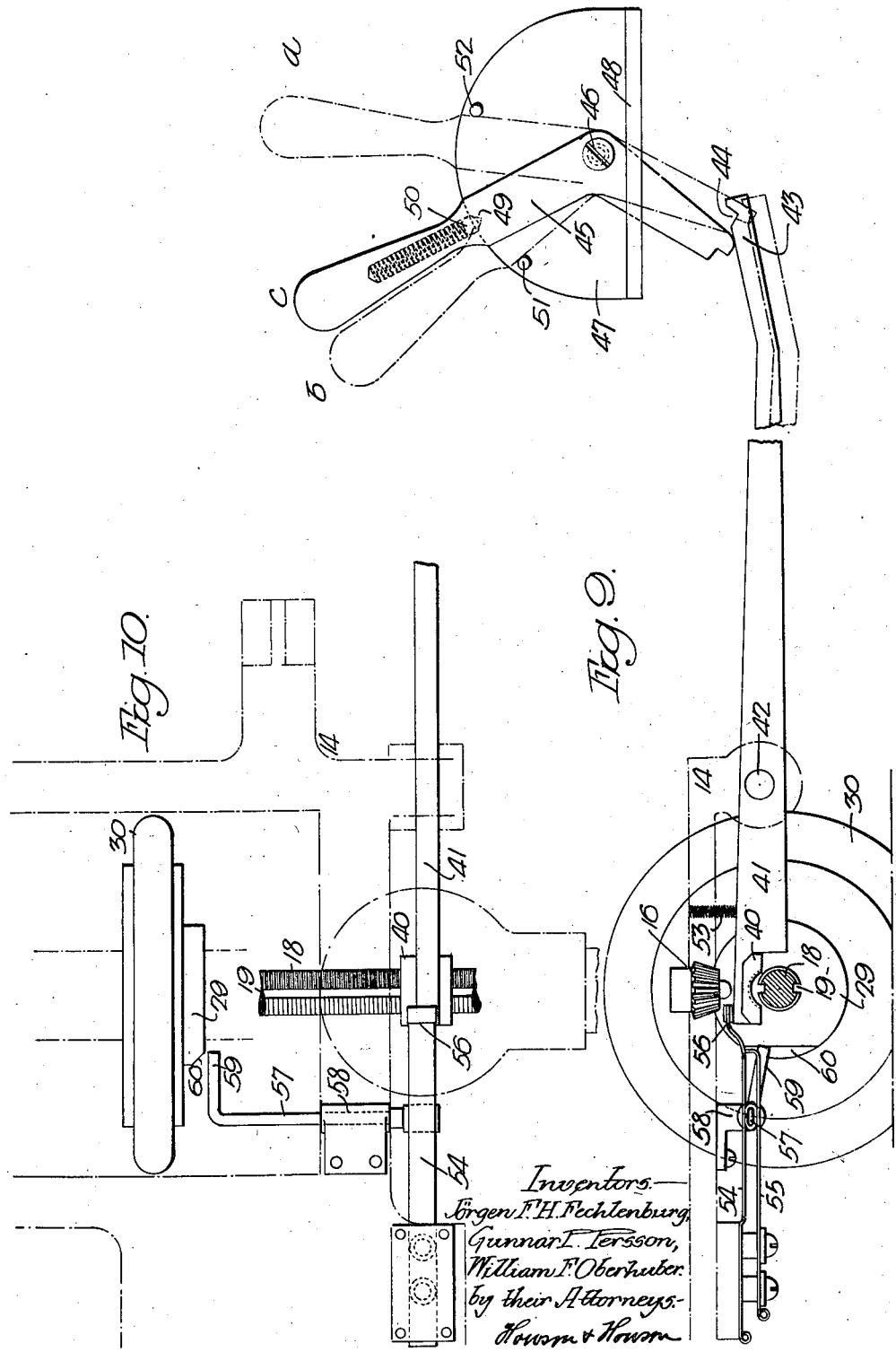

Patented May 27, 1924.

1,495,783

UNITED STATES PATENT OFFICE.

JÖRGEN F. H. FECHTENBURG, OF PHILADELPHIA, AND GUNNAR P. PERSSON AND WILLIAM F. OBERHUBER, OF EAST LANSDOWNE, PENNSYLVANIA; SAID PERSSON AND OBERHUBER ASSIGNORS TO SAID FECHTENBURG.

TALKING MACHINE.

Application filed January 23, 1922. Serial No. 531,200.

*To all whom it may concern:*

Be it known that we, JÖRGEN F. H. FECHTENBURG, GUNNAR P. PERSSON, and WILLIAM F. OBERHUBER, citizens of the United States, said FECHTENBURG residing in Philadelphia, Pennsylvania, and said PERSSON and OBERHUBER residing in East Lansdowne, Delaware County, Pennsylvania, have invented certain Improvements in Talking Machines, of which the following is a specification.

Our invention relates to certain improvements in a talking machine for which patent was granted to J. F. H. Fechtenburg February 13, 1917, No. 1,216,222, speed regulating device for talking machines.

The object of the present invention is to improve the details of construction of the talking machine by simplifying the parts and increasing the accuracy.

This object we attain in the following manner, reference being had to the accompanying drawings, in which:—

Fig. 2 is a sectional view on the line 2—2, Fig. 1;

Fig. 3 is a sectional view on the line 3—3, Fig. 1;

Fig. 4 is a plan view of the mechanism with the table removed;

Fig. 5 is an enlarged longitudinal sectional view of a portion of the mechanism illustrated in Fig. 3;

Fig. 6 is a sectional view on the line 6—6, Fig. 5;

Fig. 7 is a sectional view on the line 7—7, Fig. 5;

Fig. 8 is a sectional view on the line 8—8, Fig. 5;

Fig. 9 is a side view, partly in section, showing details of the device, which are illustrated in Fig. 2; and Fig. 10 is a plan view of a portion of Fig. 9.

Figure 1:
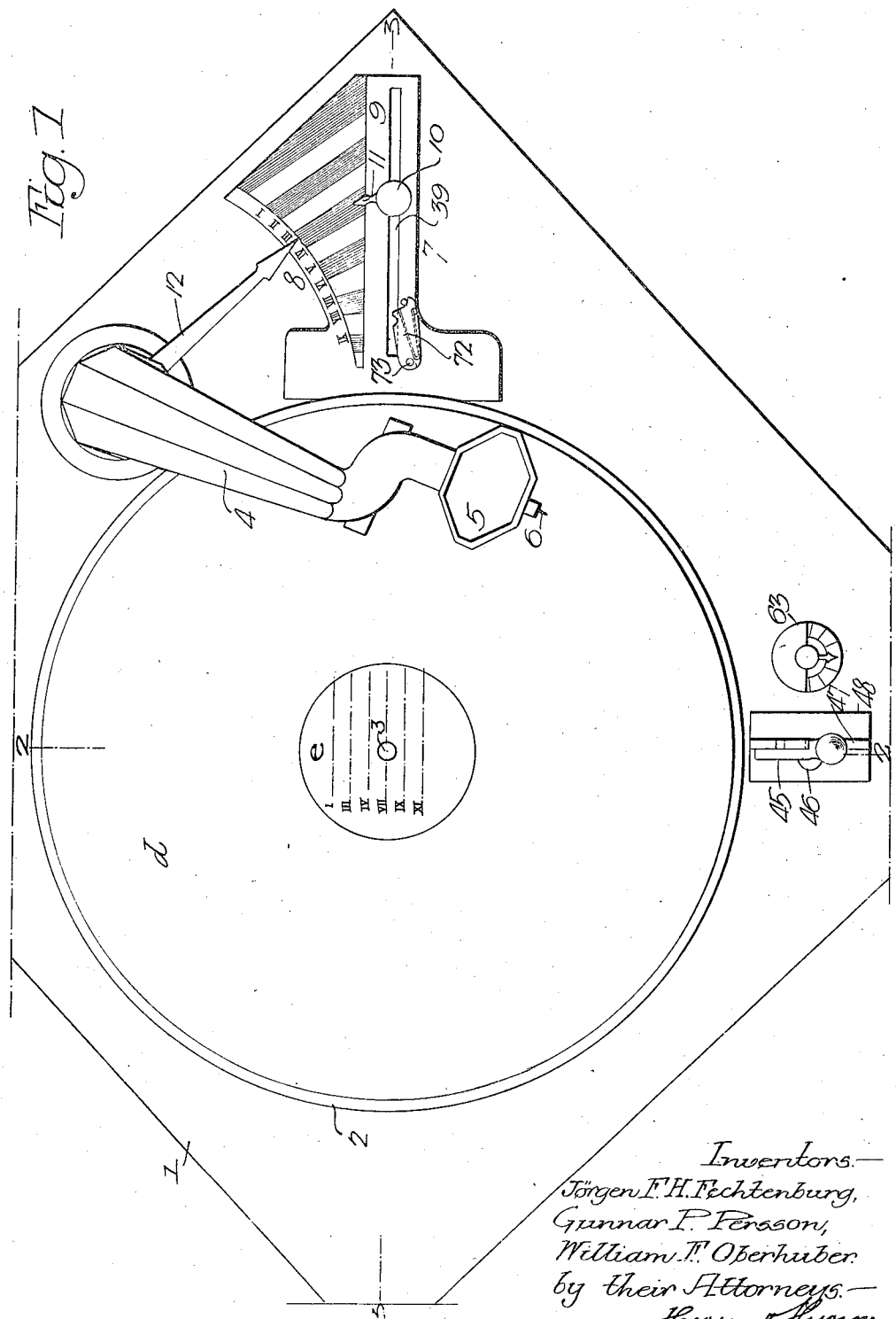
Fig. 1 is a plan view of a talking machine illustrating our invention.

The main feature of this invention, as in the patent hereinbefore referred to, is to increase the capacity of the machine and to regulate the speed of the turn table so that the surface speed at the point of contact of the stylus with the record will be the same throughout the entire width of the turn table.

Referring to the drawings, 1 is the main frame or body of a talking machine. 2 is the turn table mounted on a pivot 3. 4 is the tone arm pivoted in the usual manner and connected to any suitably constructed horn. Carried by the tone arm is a reproducer 5 having a stylus 6. Mounted on the main frame 1 is a plate 7 having a segment 8 with lines radiating from the segment to a straight slot 9 for the passage of a knurled handle 10, hereinafter described, which has a pointer 11. On the tone arm 4 is a pointer 12, which registers with the segment 8. The object of this device is to indicate the position of the different records on the one disk, as the disk can be made of such a size that it may contain several selections.

By having the indicating marks, the stylus can be moved to any one of the records, as indicated on an index printed at the center of the record disk. By providing the handle 10 the power mechanism for turning the table can be moved to a corresponding position directly in line with the stylus.

The table 3 is mounted in a ball bearing 13 supported on a metallic bearing frame 14 set in the main frame or body 1 of the machine. Mounted in the bearing is a bevel wheel 15, which meshes with a bevel pinion 16 on the lower end of the pivot 3. The bevel wheel 15 has a long hub 17 and extending through the hub is a screw 18. The screw has a longitudinal groove 19 therein and a key 20 on the bevel gear wheel 15 extends into the groove so that the screw must turn with the wheel, although it can be moved longitudinally through the wheel. Mounted in the bearing 14 is a hollow shaft 21 to which is secured a worm wheel 22, which meshes with a worm 23 on a power driven shaft 24. This worm is located in a casing 25. The shaft 24 is connected to the armature shaft of an electric motor 26 by a flexible joint 69, in the present instance. The hollow shaft 21 is slotted at 27 for the passage of an arm 28 secured to the hub 29 of a friction wheel 30. This hub is free to slide longitudinally on the hollow shaft 21 and has a rubber tread 31, which bears against the under side of the turn table 2, as clearly shown in Fig. 5.

The screw 18 is reduced at 32 and extends through the arm 28 and has collars 33 and 34, one on each side of the arm. The end 35 of the screw is still further reduced and has a screw thread thereon to which is adapted a nut 36 and a coupling 37 to which is attached a rod 38, which extends through the end of the hollow shaft 21 and is bent at right angles, as shown in Fig. 3. This portion of the rod extends through the slot 9 in the plate 7 and is provided with the knurled handle 10 and pointer 11. By this means the screw, with the wheels 30, can be moved to any position desired by the operator when the nut is out of engagement with the screw.

40 is a nut, which is arranged to mesh with the thread of the screw 18 and is secured to a lever 41 mounted on a pivot 42 having its bearings in the bearing frame 14. The long arm of the lever 41 is bent upwards, as shown at 43, and is notched at 44. A lever 45, pivoted at 46 to a segment 47 of a plate 48 mounted on the main frame 1, has an arm which engages the lever 41 so as to raise the nut 40 out of engagement with the screw. The segment 47 has two stops 51 and 52 and is notched at 49 midway between the stops.

When the hand lever 45 is in the position shown by full lines in Fig. 2 and against the stop 52, then the lever 41 is free of the hand lever 45 and a spring 53 forces the nut into engagement with the screw. When the parts are in this position, the screw feeds the wheel 30 under the table at the same speed at which the stylus is fed over the table.

When the hand lever 45 is moved to a position against the stop 51, the lever 41 carrying the nut 40 is shifted so as to move the nut out of engagement with the screw, the lever also comes in contact with the pin of the pivot 3 and raises the table out of contact with the wheel 30. When the hand lever 45 is in the mid position and the spring pressed ball 50 is in the notch 49 then the nut is raised clear of the screw and ordinary records can be used as the wheel remains in a fixed position.

54 and 55 are two contact plates in the circuit connected to the electric motor, 26, shown in Fig. 2. The plate 55 is turned up at the end to bear upon the plate 54 to close the circuit. The plate 54 has an extension 56, which projects over the end of the lever 41 so that, as the lever is raised to disengage the nut and lift the table, the contact between the two plates 54 and 55 is broken and the motor is stopped. Extending between the two plates is a shaft 57 adapted to a bearing 58. This shaft is flattened, as shown in Figs. 9 and 10, and has a non-conducting covering. When the shaft is in the normal position it does not separate the two plates 54 and 55. The shaft has an arm 59, which is in the path of the hub 29 of the wheel 30 so that, when the beveled portion 60 of the hub comes in contact with the arm 59, it turns the shaft 57 and separates the two contact plates, automatically stopping the machine. The under side of the table 2 is grooved at 61 so that, when the wheel 30 reaches this groove, which is at the end of the record, the wheel is relieved of pressure.

The governor and the controlling mechanism therefor is of the ordinary type. 63 is the governor control, which extends through the main frame 1 and actuates a lever 64 pivoted at 65. 66 is another lever mounted on the same pivot as the lever 64 and is provided with an adjusting screw 67, which bears upon said lever 64. An arm of this lever 66 is so located in respect to the governor 68, which is mounted on the shaft 24, that on adjusting the control 63 the governor can be regulated to control the speed of the driving mechanism.

The free end of the screw 18 travels in a tube 70 mounted in the bearing frame 14, as clearly shown in Figs. 3 and 5. The screw has at its outer end a collar 71, which neatly fits the tube 70 and forms a bearing for this end of the screw. In order to hold the wheel in position so that ordinary records can be reproduced a spring latch 72 is provided pivoted to the plate 7 at 73. This spring latch engages the vertical portion of the rod 38 when the wheel is in a position close to the groove 61, holding it in this position until it is forcibly removed by the operator.

The operation of the machine is as follows: The machine is so constructed that the surface speed of a record at the point of contact of the stylus will be the same throughout the entire width of the record, or turn table, as the wheel 30, which gives motion to the table, travels towards the center of rotation of the turn table with the stylus.

The reproductions on the records of this machine are all of the same length, irrespective of the position of the record on the disk. As the surface speed is always the same, a greater length of record can be accommodated with a given diameter of disk than can be accommodated by the ordinary method.

When a record of the type above described is used, then the hand lever 45 is in the position $a$, Fig. 9, the nut being in engagement with the screw 18 and, as the wheel rotates, it will drive the turn table and the screw will feed the wheel towards the center of rotation of the table. When it is wished to stop the machine, then the hand lever is moved to the position $b$, Fig. 9, which not only disengages the nut, but also lifts the table out of contact with its driving wheel 30, and lifts the electric contact plate 54 away from the plate 55 stopping the rotation of the mechanism.

When a record of the usual type is used on the machine, then the hand lever 45 is moved to the position c, which merely disengages the nut but does not lift the table out of contact with its driving wheel. As the nut is out of engagement with the screw, the wheel will remain in the position in which it is set and will rotate the table at a given speed, but the surface speed will vary as the stylus travels from the periphery of the record towards the center of rotation.

The screw is not driven directly from the worm wheel 22 but indirectly through the hollow shaft 21, wheel 30, turn table 2, bevel pinion 16 and the bevel wheel 15. By this means, the speed of rotation of the screw will be increased as the wheel travels towards the center of rotation of the table. As indicated in Fig. 1, the record $d$ has a blank central portion $e$, which is utilized to indicate the different selections that are recorded on a record, as a record made in accordance with our invention may have a series of different selections thereon.

By indicating the different selections on the record on the central blank portion, the indicating marks can be duplicated on the segmental plate 7 so that, by moving the tone arm to a given position, as shown on the record, any one of the selections on the record can be reproduced without reproducing the other selections.

While we have illustrated a machine in which the screw moves past a nut located in a fixed position, the nut may be mounted on a moving part and the screw may be fixed.

We claim:

1. In a sound-wave translating device, a turn table; a wheel for driving the turn table; and a longitudinally movable screw for traversing the wheel.

2. In a talking machine, a turn table; a wheel for driving the turn table; means for imparting a rotary motion to the wheel; and a longitudinally movable screw and a fixed nut engaging the screw and arranged to traverse the wheel towards the center of rotation of the turn table.

3. A translating device including a turn table; a wheel bearing against the turn table; means for rotating the wheel; a longitudinally movable screw connected to the wheel; a nut located in a fixed position arranged to engage the screw; and means for moving the nut into and out of engagement with the screw.

4. In a talking machine, a pivotally mounted turn table; a stylus adapted to travel over the face of the turntable; a wheel bearing against the under side of the turn table; means for driving the wheel; a longitudinally movable screw connected to the wheel for moving the wheel towards the center of rotation of the turn table; a nut located in a fixed position and arranged to engage the screw to traverse the wheel; a gear wheel splined to the screw by which the screw is turned; and a pinion meshing with the gear wheel and driven from the turn table; whereby the rate of advance of the stylus and the wheel toward the center of rotation of said turn table may be equal.

5. A talking machine comprising a pivotally mounted turn table; a hollow shaft located under the turn table; means for driving the shaft; a wheel arranged to turn with the shaft and slide thereon, said wheel being so positioned as to turn the turn table; a bevel pinion on the pivot of the turn table; a bevel gear wheel meshing with the pinion and mounted on the same center line as the hollow shaft; a screw extending through the bevel wheel, the wheel being splined to the screw so that it will turn the screw; and a nut engaging the screw so as to cause it to move longitudinally and traverse the wheel towards the center of rotation of the turn table.

6. A talking machine comprising a table; a pivot therefor; means for rotating the turn table; driving means for said last-mentioned means; mechanism for causing the rotating means to be traversed towards the center of rotation of the turn table; and mechanism for disengaging the traversing means and for raising the pivot with the turn table out of contact with the rotating means, said mechanism also being adapted to render inoperative said driving means.

7. A talking machine; a pivot; a turn table mounted on the pivot; a stylus positioned for bodily movement over the turn table; a hollow shaft under the turn table; a wheel mounted to turn with the shaft and bearing against the under side of the turn table; a screw extending through the hollow shaft and attached at one end to the wheel; a nut arranged in a fixed position and capable of being moved into and out of contact with the screw; and gearing for driving the screw through the pivot and turn table; whereby the rate of bodily movement of the wheel and the stylus may be equal.

8. In a talking machine, a pivot; a turn table carried by the pivot; a stylus arranged to travel over the turn table; a hollow shaft, a wheel mounted on the shaft and engaging the turn table; a motor for driving said hollow shaft; a screw extending through the shaft and attached at one end to the wheel; means for turning the screw through the turn table; a nut engaging the screw and located in a fixed position; means for raising the nut out of engagement with the screw; and means for lifting the turn table out of contact with the driving wheel; whereby the rate of bodily movement of the wheel and the stylus may bear a predetermined relation to each other.

9. In a talking machine, a pivot; a turn table carried by the pivot; a hollow shaft;

a wheel mounted on the shaft and engaging the turn table; an electric motor for driving the said hollow shaft; a screw extending through the shaft and attached at one end to the wheel; means for turning the screw through the turn table; a nut engaging the screw and located in a fixed position; means for raising the nut out of engagement with the screw; means for lifting the turn table out of contact with the driving wheel; and contact plates connected to the motor normally in contact with each other, one plate being separated from the other when the table is raised so as to break the contact and stop the rotation of the mechanism.

10. In a talking machine, a pivot; a turn table carried by the pivot; a hollow shaft having a longitudinal slot therein; a wheel on the shaft; an arm on the wheel extending into the hollow shaft; a screw in the hollow shaft engaged by the arm of the wheel; a nut arranged to mesh with the screw; means for rotating the screw through the turn table and pivot; and means for rotating the hollow shaft.

11. In a translating device, a revolubly mounted pivot; a table carried by the pivot; a hollow shaft; a wheel on the shaft bearing against the under side of the turn table; a screw extending through the hollow shaft and connected to the wheel; a bevel wheel through which the screw extends, said wheel being splined to the screw so as to turn the screw; a bevel pinion on the pivot meshing with the bevel wheel so that the screw is driven through the turn table and pivot; a lever pivoted to the bearing; a nut carried by the lever and arranged to engage the screw, said lever being located under the pivot; and means for raising the lever so as to move the nut out of engagement with the screw and, on its continued movement, to raise the pivot and the turn table carried thereby.

12. In a change-speed mechanism, a revolubly mounted pivot; a turn table carried by the pivot; a wheel bearing against the under side of the turn table; means for rotating the wheel; and means for moving it towards the center of rotation; said turn table having an annular groove in the under side thereof into which the wheel is movable, the depth of the groove being such that the wheel will be in slight contact with the turn table.

13. Mechanism comprising a revolubly mounted pivot; a turn table carried by the pivot; a wheel bearing against the under side of the turn table, said turn table having an annular groove near the pivot; a screw connected to the wheel; a nut engaging the screw so as to cause the screw to move the wheel towards the center of rotation; means, driven from the turn table and pivot, for turning the screw; an electric motor for driving the wheel; two electric contact plates normally in contact; and a shaft having a flattened portion extending between the plates and having an arm arranged to be engaged by the wheel when the wheel is in the groove on the under side of the turn table so that when the wheel is in the groove of the table the motor will be automatically stopped.

14. In a talking machine, a main frame; a bearing frame mounted in the main frame; a pivot located in the bearing frame; a turn table carried by the pivot; a slotted, hollow shaft mounted in the bearing frame; a wheel mounted on the shaft and bearing against the turn table; a screw extending through the hollow shaft and connected at one end to the wheel; means for rotating the screw from the turn table and pivot; a nut located in a fixed position engaging the screw; a lever on which the nut is mounted; and a hand lever engaging the nut carrying the lever; said hand lever being arranged to be moved into three different positions to cause the nut to engage the screw, to move the nut out of engagement with the screw, or to raise the pivot and turn table out of engagement with the driving wheel.

15. In combination a bearing frame; a pivot mounted in the bearing frame; a turn table carried by the pivot; a slotted hollow shaft mounted in the bearing frame; means for rotating said shaft; a driving wheel mounted on the shaft and rotated thereby; a screw extending into the hollow shaft and attached at one end to the wheel; a guide for the opposite end of the screw; means for driving the screw through the turn table and its pivot; a nut located in a fixed position and arranged to engage the screw so as to cause the screw to move longitudinally and to move the driving wheel towards the center of rotation of the table; and means for engaging or disengaging the nut and the screw.

16. In combination a frame; a turn table; a pivot therefore; a hollow shaft; means for driving the hollow shaft; a wheel arranged to turn with, but slide on the said shaft and arranged to bear against the under side of the turn table; a screw extending into the hollow shaft and connected to the wheel; means for driving the screw from the turn table and its pivot; a nut engaging the screw; a rod attached to the end of the screw and having a handle extending through the frame; and a slotted plate on the frame through which the handled rod extends, said plate having a gage to indicate the position of the wheel under the table.

JÖRGEN F. H. FECHTENBURG.
GUNNAR P. PERSSON.
WILLIAM F. OBERHUBER.